May 12, 1959 W. A. RAY 2,886,063
VALVE STRUCTURE
Filed Aug. 12, 1957
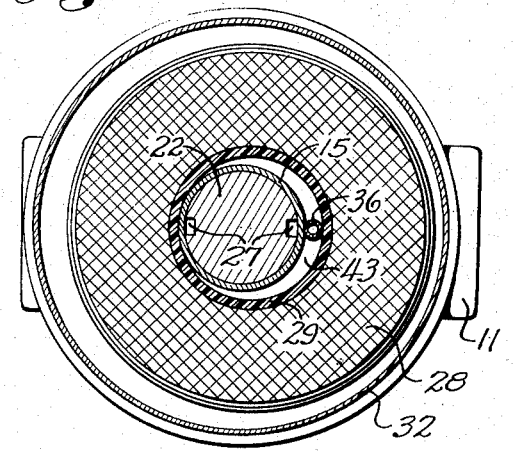
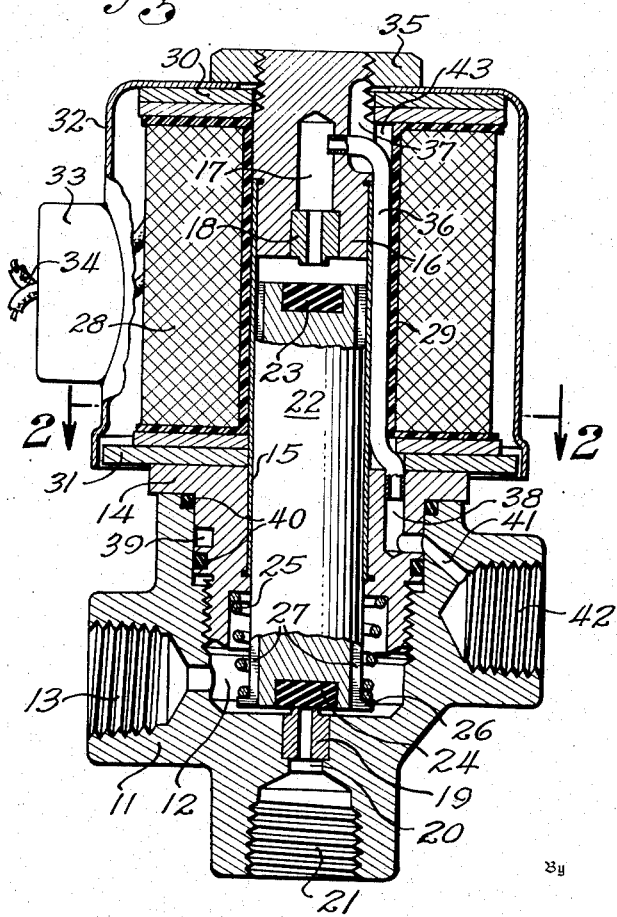
Inventor,
WILLIAM A. RAY
John H. Rouse,
Attorney United States Patent Office 2,886,063
Patented May 12, 1959

2,886,063

VALVE STRUCTURE

William A. Ray, North Hollywood, Calif., assignor to General Controls Co., Glendale, Calif., a corporation of California Application August 12, 1957, Serial No. 677,673

6 Claims. (Cl. 137—625.27)

My present invention relates to solenoid valves of the type having a plunger reciprocable in a tube protruding sealingly from a valve casing, and a solenoid coil around the tube for attracting the plunger.

When such a solenoid valve is of the simple open-closed type the plunger is usually provided at its end inside the valve casing with a closure cooperable with a valve port in the casing. But when the valve is of the three-way type the plunger may also have a closure at its outer end cooperable with an additional valve port in a member closing the outer end of the plunger tube, a passage (conveniently between the plunger and the tube) being provided for flow between this port and the valve casing.

In such a three-way construction there is normally a pipe connection at the outer end of the plunger tube, which connection must be broken in the event that it becomes necessary to replace the solenoid coil because of burn-out, or if the voltage of the energizing source is changed. Breaking of this connection is disadvantageous under any circumstances and is particularly so if the valve is connected in a refrigeration system, inasmuch as subsequent pumping-down of the system by a qualified maintenance man is then required.

It is therefore an object of this invention to provide a solenoid valve of the character described having a valve port at the outer end of the plunger tube, and a pipe connection for this port arranged so that the coil around the plunger tube can be removed and replaced without breaking this connection.

Further objects and advantages of the invention will become apparent from the following description and accompanying drawing, and from the appended claims.

In the drawing:

Figure 1 is a longitudinal sectional view of a three-way valve structure embodying this invention; and Figure 2 is a transverse section taken along the line 2—2 of Fig. 1.

In the drawing the numeral 11 indicates a valve casing having an inner chamber 12 and a passage 13 branching from the chamber for connecting the valve structure in a fluid conveying system. Mounted in an opening through the top wall of chamber 12, by means of a threaded fitting 14, is a thin-walled plunger tube 15, of non-magnetic material, having in its upper end a member 16 of magnetic material. The tube 15 is sealingly secured to fitting 14 and to member 16 as by solder.

The member 16 has a valve port 17, coaxial with the plunger tube, in the lower end of which port a tubular seat-member 18 is pressed. In the bottom of chamber 12, aligned with seat member 18, is another such member 19 pressed in a valve port 20 leading to a pipe-connection passage 21 at the bottom of the casing.

Inside the tube 15, and freely reciprocable therein, is a magnetic plunger member 22 having in recesses in its opposite ends closure disks 23 and 24, of rubber-like material, cooperable respectively with the seat- or port-members 18 and 19. The plunger member 22 is biased in downward direction, so that it is normally seated on port member 19, by gravity and by the force of a spring 25 compressed between fitting 14 and a flange 26 around the bottom of the plunger member. As is better seen in Fig. 2, there are slots 27 in opposite sides of the plunger member for flow of fluid between chamber 12 and the upper end of plunger tube 15.

Around the plunger tube, at the outside of the valve casing, is an electromagnet comprising an annular coil 28 wound on a form 29 and having at its top and bottom iron washers 30 and 31 for confining the magnetic flux produced by passage of current through the coil. The electromagnet is surrounded by a housing 32 having a conduit fitting 33 through which the leads 34 of the coil extend. The electromagnet assembly is clamped to the top of the casing-fitting 14 by a nut 35 threaded on the upper end of member 16. When the electromagnet is energized the plunger 22 is attracted upwardly out of engagement with port-member 19 and into engagement with the other port-member 18.

The member 16 (in the top of the plunger tube) has a lateral opening leading into port 17 and sealingly receiving the upper end of a small pipe 36, preferably of nonmagnetic material. This pipe is bent near its top (a recess 37 being provided in member 16 to accommodate the bend) and extends downwardly alongside the plunger tube. The lower end of pipe 36 passes through a notch in washer 31 and is sealingly received in a vertical passage 38 in fitting 14, which passage leads to a groove 39 around the fitting and between a pair of sealing rings 40. Groove 39 is in communication, through an inclined opening 41, with another pipe-connection passage 42 at the right of the valve casing. As can be seen in Fig. 2 the coil form 29 is arranged eccentric to plunger tube 15, the inner diameter of the coil form being made larger than the outer diameter of the tube to provide a space 43 between these parts for the pipe 36. By unthreading nut 35 the solenoid coil and associated parts can be withdrawn from around the tube for replacement of the coil, if necessary.

When the pressure of the fluid controlled by the valve is relatively high a single small pipe, such as that shown at 36, usually has sufficient flow capacity. However, if it is desired to increase the flow between port 17 and passage 42 the inner diameter of the coil form may be made slightly larger so that the space 43 can then accommodate several small pipes or a single larger pipe of a shape in cross section conforming generally to that of the space.

While the valve structure of this invention has particular utility for three-way fluid control, it can be employed as a simple one-way valve by eliminating the bottom port 19. Also, if desired, the relative arrangement of the plunger and the coil can be altered to effect attraction of the plunger in a direction inward of the valve casing against a force biasing the plunger outwardly.

It is obvious that the specific valve structure herein shown and described in susceptible of still further modification without departing from the spirit of the invention, and I intend therefore that no limitation be placed on the invention except as defined by the scope of the appended claims.

I claim as my invention:

1. In a solenoid valve: a valve casing having an inlet passage and an outlet passage, and an inner chamber communicating with one of said passages; a solenoid operator at the outside of said casing and comprising an elongated plunger-tube sealingly mounted at one of its ends in an opening through a wall of said chamber; a solenoid plunger-member inside said tube and movable in directions inward and outward of the casing; means for moving said plunger member in one of said directions; an annular solenoid coil around said tube at the outside of the casing and adapted, when energized, to move said plunger member in the other of said directions; a member sealingly mounted in the outer end of said tube and providing a valve port aligned with and closable by the plunger member when the same is moved in said outward direction; means defining a passage for flow between said chamber and said outer end of said tube; and means, between said tube and said solenoid coil, defining a passageway interconnecting said valve port and the other of said casing-passages.

2. A solenoid valve according to claim 1 wherein said passageway-defining means comprises a pipe extending alongside said tube.

3. A solenoid valve according to claim 2 wherein the inner diameter of said coil is larger than the outer diameter of said tube, and the coil is arranged eccentric to the tube to provide a space for said pipe.

4. In a solenoid valve of the three-way type: a valve casing having a chamber therein; a solenoid operator at the outside of said casing and comprising an elongated plunger-tube sealingly mounted at one of its ends in an opening through a wall of said chamber; a solenoid plunger-member, inside said tube, movable in directions inward and outward of the casing and biased in one of said directions; an annular solenoid coil removably mounted around said tube at the outside of the casing and adapted, when energized, to move said plunger member in the other of said directions; a member sealingly mounted in the outer end of said tube and providing a first valve port aligned with and closable by the plunger member when the same is moved in said outward direction; means defining a passage for flow between said chamber and said outer end of said tube; a second valve port, in said casing, aligned with and closable by said plunger member when the same is moved in said inward direction; said casing providing three passages for connecting the valve in a fluid conveying system: a first passage communicating directly with said chamber, a second passage communicating with said second valve port, and a third passage separate from said first and second passages; and means, between said plunger tube and said solenoid coil, defining a passageway interconnecting said first valve port and said third passage.

5. A solenoid valve according to claim 4 wherein said passageway-defining means comprises a pipe extending alongside said plunger tube.

6. A solenoid valve according to claim 5 wherein the inner diameter of said coil is larger than the outer diameter of said tube, and the coil is arranged eccentric to the tube to provide a space for said pipe.

References Cited in the file of this patent

UNITED STATES PATENTS

| | | |
|---|---|---|
| 2,624,585 | Churchill et al. | Jan. 6, 1953 |
| 2,710,162 | Snoddy | June 7, 1955 |

FOREIGN PATENTS

| | | |
|---|---|---|
| 726,379 | Great Britain | Mar. 16, 1955 |